(12) United States Patent
Badaloo et al.

(10) Patent No.: US 9,152,931 B2
(45) Date of Patent: Oct. 6, 2015

(54) SERVICE ENGAGEMENT MANAGEMENT USING A STANDARD FRAMEWORK

(75) Inventors: Moonish Badaloo, Orlando, FL (US); Kavita Chavda, Roswell, GA (US); Matthew Denesuk, Redwood City, CA (US); Leslie M. Ernest, Knoxville, MD (US); Felicia A. Hochheiser, New York, NY (US); Joanne L. Martin, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 1971 days.

(21) Appl. No.: 11/755,167

(22) Filed: May 30, 2007

(65) Prior Publication Data

US 2008/0301698 A1 Dec. 4, 2008

(51) Int. Cl.
*G06F 9/46* (2006.01)
*G06Q 10/06* (2012.01)

(52) U.S. Cl.
CPC .................................. *G06Q 10/06* (2013.01)

(58) Field of Classification Search
None
See application file for complete search history.

(56) References Cited

U.S. PATENT DOCUMENTS

| | | | |
|---|---|---|---|
| 5,548,779 A | 8/1996 | Andert et al. | |
| 5,848,394 A | 12/1998 | D'Arrigo et al. | |
| 6,266,666 B1 | 7/2001 | Ireland et al. | |
| 6,632,251 B1 * | 10/2003 | Rutten et al. | 715/205 |
| 7,054,699 B2 | 5/2006 | Nakamura | |
| 8,132,153 B2 * | 3/2012 | Subramanyam | 717/121 |
| 2004/0002883 A1 | 1/2004 | Andrews et al. | |
| 2004/0044555 A1 | 3/2004 | Bangs et al. | |
| 2004/0078373 A1 * | 4/2004 | Ghoneimy et al. | 707/10 |
| 2005/0044099 A1 * | 2/2005 | Soares et al. | 707/102 |
| 2007/0033590 A1 * | 2/2007 | Masuouka et al. | 718/100 |

OTHER PUBLICATIONS

Channabasavaiah et al., "Migrating to a service-oriented architecture, Part 1," http://www-128.ibm.com/developerworks/webservices/library/ws-migratesoa/, Dec. 16, 2003, pp. 1-6.
Channabasavaiah et al., "Migrating to a service-oriented architecture, Part 2," http://www-128.ibm.com/developerworks/webservices/library/ws-migratesoa2/, Dec. 16, 2003, pp. 1-7.
Beisiegel et al., "Service Component Architecture Building Systems using a Service Oriented Architecture," Joint Whitepaper, Version 0.9, Nov. 2005, 31 pages.

* cited by examiner

*Primary Examiner* — Mengyao Zhe
(74) *Attorney, Agent, or Firm* — Maeve McCarthy; Hoffman Warnick LLC

(57) ABSTRACT

A solution for managing a service engagement is provided. A service delivery model for the service engagement is defined within an engagement framework. The engagement framework, and consequently the service delivery model, can include a hierarchy that comprises a service definition, a set of service elements for the service definition, and a set of element tasks for each service element. The set of element tasks can be selected from a set of base tasks, each of which defines a particular task along with its input(s), output(s), and related asset(s). As a result, service engagements can be managed in a consistent manner using a data structure that promotes reuse and is readily extensible.

20 Claims, 7 Drawing Sheets

FIG. 3

SERVICE TASK TEMPLATE 53

- TASK INPUT(S) 58A
- SKILL(S) 58B
- RELATED ASSET(S) 58C
  - TOOL(S) 59A
  - TECHNIQUE(S) 59B
  - CONFIGURABLE COMPONENT(S) 59C
- TASK OUTPUT(S) 58D
- DELIVERY MODEL 58E

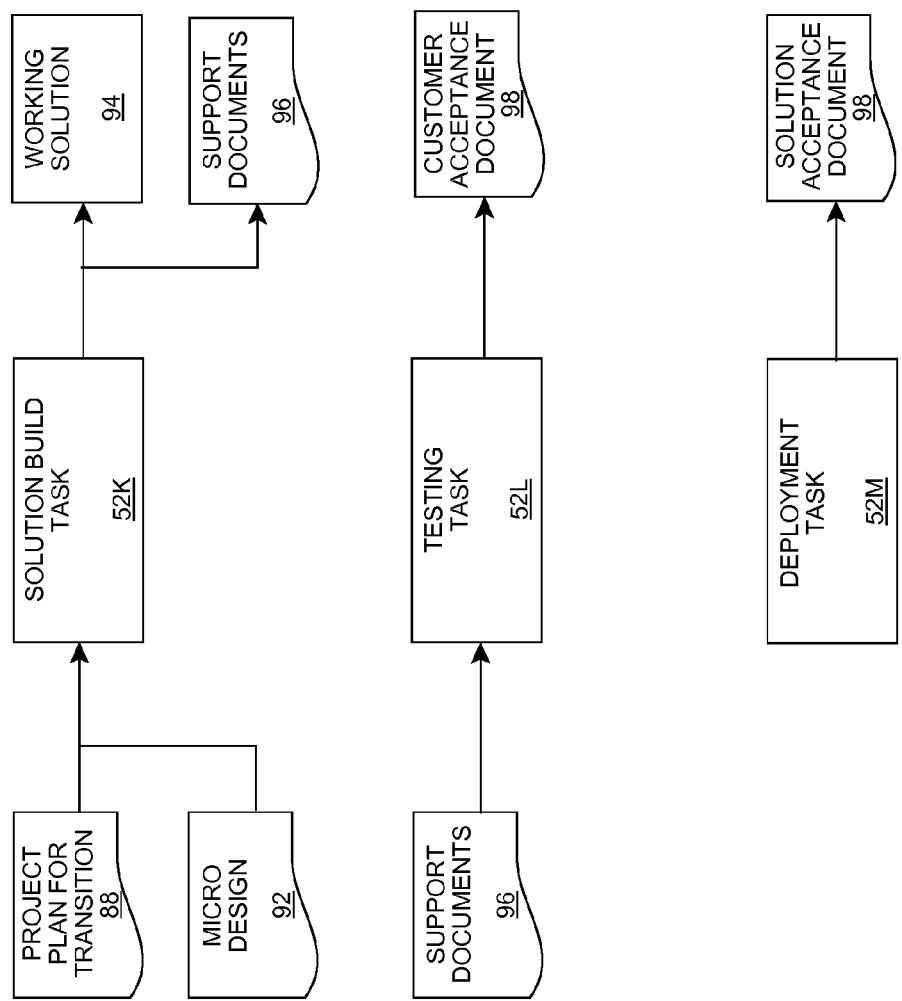

SERVICE ENGAGEMENT MANAGEMENT USING A STANDARD FRAMEWORK

FIELD OF THE INVENTION

Aspects of the invention relate generally to managing a service engagement, and more particularly, to a solution for managing the service engagement using a service delivery model defined within a standard framework.

BACKGROUND OF THE INVENTION

The development of software solutions increasingly uses an object-oriented approach. Recently, a complementary approach has been defined, which provides a service oriented approach to developing complex business software solutions. In the service oriented approach, smaller business components are developed with well defined interfaces and contracts. These business components exchange business data, rather than objects, and can be loosely coupled to create a more complex business software solution. In this manner, the business components provide a highly flexible, efficient, and extensible solution for developing complex business software solutions.

However, many services provided by businesses do not require a software solution or the software solution is only a small part of the overall services. For complex services, several groups of individuals, each with its own expertise, may participate in delivering the services at various stages. As a result, the efficiency and overall quality of the service is highly dependent on experts at each stage of the delivery. Additionally, each delivery often is defined in an ad hoc manner. As a result, handoffs between the stages often are not well-defined, and the tasks, assets (e.g., tools and methods), and skills available and/or required at each stage may vary based on the group.

In view of the foregoing, a need exists to overcome one or more of the deficiencies in the related art.

SUMMARY OF THE INVENTION

Aspects of the invention provide a solution for managing a service engagement. A service delivery model for the service engagement is defined within an engagement framework. The engagement framework, and consequently the service delivery model, can include a hierarchy that comprises a service definition, a set of service elements for the service definition, and a set of element tasks for each service element. The set of element tasks can be selected from a set of base tasks, each of which defines a particular task along with its input(s), output (s), and related asset(s). As a result, service engagements can be managed in a consistent manner using a data structure that promotes reuse and is readily extensible.

A first aspect of the invention provides a method of managing a service engagement, the method comprising: obtaining a set of base tasks, each base task including a set of task inputs, a set of task outputs, and a set of related assets for generating the set of task outputs based on the set of task inputs; defining a service delivery model for the service engagement within an engagement framework, the service delivery model including: a service definition including a set of service inputs and a set of service outputs for the service engagement; a set of service elements for generating the set of service outputs based on the set of service inputs; and a set of element tasks for a service element in the set of service elements, the set of element tasks selected from the set of base tasks; and managing the service engagement using the service delivery model.

A second aspect of the invention provides a system for managing a service engagement, the system comprising: a system for obtaining a set of base tasks, each base task including a set of task inputs, a set of task outputs, and a set of related assets for generating the set of task outputs based on the set of task inputs; a system for defining a service delivery model for the service engagement within an engagement framework, the service delivery model including: a service definition including a set of service inputs and a set of service outputs for the service engagement; a set of service elements for generating the set of service outputs based on the set of service inputs; and a set of element tasks for a service element in the set of service elements, the set of element tasks selected from the set of base tasks; and a system for managing the service engagement using the service delivery model.

A third aspect of the invention provides a computer program comprising program code stored on a computer-readable medium, which when executed, enables a computer system to implement a method of managing a service engagement, the method comprising: obtaining a set of base tasks, each base task including a set of task inputs, a set of task outputs, and a set of related assets for generating the set of task outputs based on the set of task inputs; defining a service delivery model for the service engagement within an engagement framework, the service delivery model including: a service definition including a set of service inputs and a set of service outputs for the service engagement; a set of service elements for generating the set of service outputs based on the set of service inputs; and a set of element tasks for a service element in the set of service elements, the set of element tasks selected from the set of base tasks; and managing the service engagement using the service delivery model.

A fourth aspect of the invention provides a method of generating a system for managing a service engagement, the method comprising: providing a computer system operable to: obtain a set of base tasks, each base task including a set of task inputs, a set of task outputs, and a set of related assets for generating the set of task outputs based on the set of task inputs; define a service delivery model for the service engagement within an engagement framework, the service delivery model including: a service definition including a set of service inputs and a set of service outputs for the service engagement; a set of service elements for generating the set of service outputs based on the set of service inputs; and a set of element tasks for a service element in the set of service elements, the set of element tasks selected from the set of base tasks; and manage the service engagement using the service delivery model.

A fifth aspect of the invention provides a business method for managing a service engagement, the business method comprising managing a computer system that performs the process described herein; and receiving payment based on the managing.

The illustrative aspects of the invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which:

FIG. 3 shows an illustrative service task template according to an embodiment of the invention.

FIG. 7 shows an illustrative data flow between implementation-related tasks according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for managing a service engagement. A service delivery model for the service engagement is defined within an engagement framework. The engagement framework, and consequently the service delivery model, can include a hierarchy that comprises a service definition, a set of service elements for the service definition, and a set of element tasks for each service element. The set of element tasks can be selected from a set of base tasks, each of which defines a particular task along with its input(s), output(s), and related asset(s). As a result, service engagements can be managed in a consistent manner using a data structure that promotes reuse and is readily extensible. As used herein, unless otherwise noted, the term "set" means one or more (i.e., at least one) and the phrase "any solution" means any now known or later developed solution.

In general, aspects of the invention provide a solution for managing a service engagement from initiation through implementation and/or beyond. As used herein, the term "service engagement" means a relationship between two entities in which an entity provides a set of services for another entity. The entities could be two businesses, two divisions/departments of a business, and/or the like. Further, the service could comprise any type of service, such as a temporary/permanent consulting arrangement, an Information Technology (IT) migration/update, an audit/evaluation, product development/customization, and/or the like. Additionally, an embodiment of the invention will be described herein as being implemented by a computer program. However, it is understood that the invention is not limited to such an implementation. To this extent, in other embodiments, aspects of the invention provide a solution for managing a service engagement that is partially or entirely manually implemented.

Figure 1:
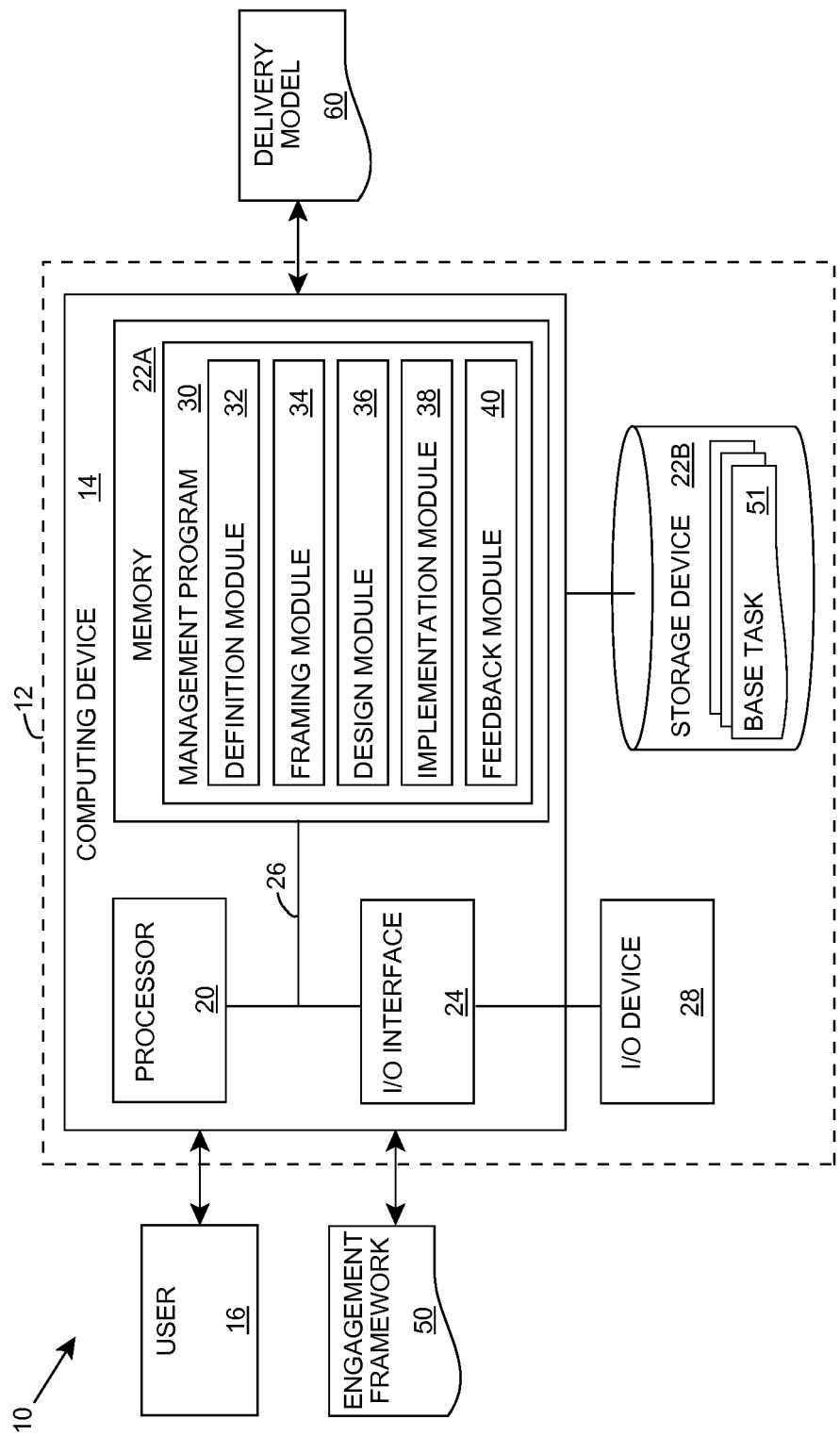
FIG. 1 shows an illustrative environment for managing a service engagement according to an embodiment of the invention.

Turning to the drawings, FIG. 1 shows an illustrative environment 10 for managing a service engagement according to an embodiment of the invention. In particular, environment 10 can generate a delivery model 60 for the service engagement based on an engagement framework 50. Delivery model 60 can be used to manage the service engagement throughout its lifetime. To this extent, environment 10 includes a computer system 12 that can perform the process described herein in order to manage the service engagement. In particular, computer system 12 is shown including a computing device 14 that comprises a management program 30, which makes computing device 14 operable to manage the service engagement by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as management program 30, which is stored in a storage system, such as memory 22A and/or storage device 22B. While executing program code, processor 20 can read and/or write data, such as delivery model 60, to/from memory 22A, storage device 22B, and/or I/O interface 24. Bus 26 provides a communications link between each of the components in computing device 14. I/O device 28 can comprise any device that transfers information between a user 16 and computing device 14. To this extent, I/O device 28 can comprise a human-usable I/O device to enable an individual (user 16) to interact with computing device 14 and/or a communications device to enable a system (user 16) to communicate with computing device 14 using any type of communications link.

In any event, computing device 14 can comprise any general purpose computing article of manufacture capable of executing program code installed thereon. However, it is understood that computing device 14 and management program 30 are only representative of various possible equivalent computing devices that may perform the process described herein. To this extent, in other embodiments, the functionality provided by computing device 14 and management program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, management program 30 enables computer system 12 to manage a service engagement. To this extent, management program 30 is shown including a definition module 32, a framing module 34, a design module 36, an implementation module 38, and a feedback module 40. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of management program 30 and/or computer system 12.

Regardless, aspects of the invention provide a solution for managing a service engagement using service delivery model 60 defined within an engagement framework 50. In this manner, an entity can define service engagements in a consistent and uniform manner. In an embodiment, engagement framework 50 provides a component-based solution to developing service delivery model 60 and delivering the service engagement (e.g., solution). Use of a component-based solution enables the components in one service engagement to be reused in other service engagements, thereby enabling a more efficient (e.g., cost and time) delivery of the service engagement. For example, components used in an analysis of another entity may be made available (e.g., as a global resource) and used in multiple service engagements with the entity. Similarly, higher level project planning components may be made available and used in multiple service engagements of a similar nature.

Use of engagement framework 50 to define service delivery model 60 can provide additional efficiencies and benefits. For example, individuals and assets can be transferred to an existing service engagement with a reduced learning curve due to the consistent planning and delivery approaches used across service delivery models 60 for service engagements. To this extent, a project manager could be transferred to an existing service engagement and be able to quickly and effectively manage it. Further, a componentized engagement framework 50 and/or service delivery model 60 can be readily scaled/extended to accommodate particular service engagements and/or changes in processes. In this case, the overall impact of these changes is limited through the use of the components.

Figure 2:
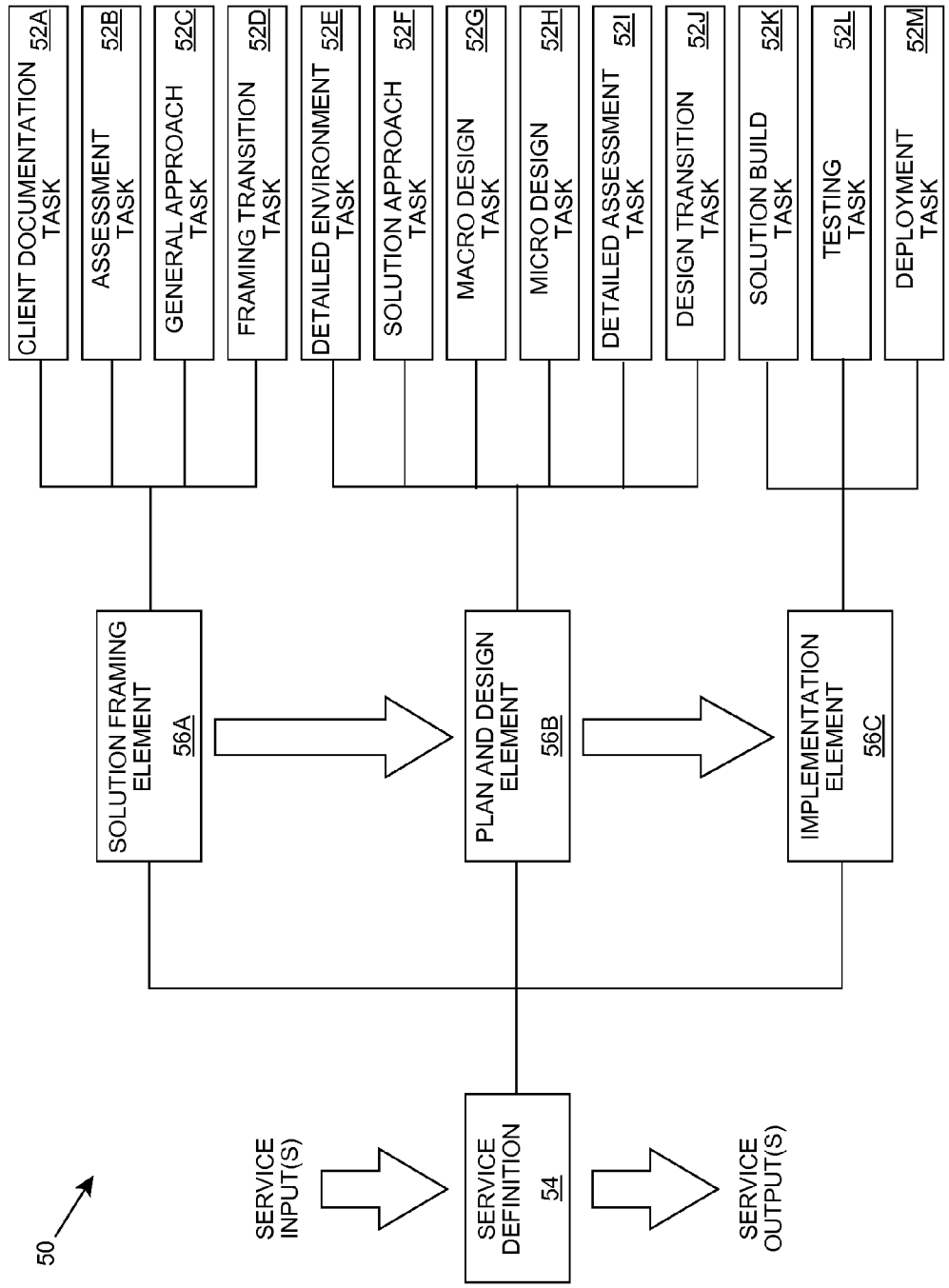
FIG. 2 shows an illustrative engagement framework according to an embodiment of the invention.

FIG. 2 shows an illustrative engagement framework 50 according to an embodiment of the invention. Engagement framework 50 can be stored and managed using any solution (e.g., one or more files, entries in a relational database, and/or the like). Regardless, engagement framework 50 comprises a service definition 54, a set of service elements 56A-C, and a set of element tasks 52A-M. As shown, service definition 54 is related to the set of service elements 56A-C, which in turn are related to the set of element tasks 52A-M in a hierarchical manner. While engagement framework 50 is shown as a hierarchy comprising three levels, it is understood that engagement framework 50 can comprise a hierarchy of any number of levels. For example, engagement framework 50 can comprise a fourth level that is a parent of multiple service definitions 54. In this manner, a service delivery model 60 (FIG. 1) for a more complex service engagement can be readily defined. Similarly, one or more element tasks 52A-M could include a set of child sub-tasks, a simple service engagement could be defined using a hierarchy having two levels, etc.

An embodiment of the invention provides a solution for defining engagement framework 50. Referring to FIGS. 1 and 2, user 16 can utilize definition module 32 to define engagement framework 50 using any solution. For example, definition module 32 can manage a set of base tasks 51, each of which comprises a basic service offered by the entity. User 16 can define base tasks 51 by evaluating existing service offerings and componentizing each service offering into one or more base tasks 51. In an embodiment of the invention, each base task 51 generates a single output (e.g., a result, a document, and/or the like), which can be used by other base tasks 51 and/or a service element 56A-C. In this case, when an existing service offering generates four outputs, four base tasks 51 can be generated based on the service offering.

Definition module 32 can enable user 16 to define each base task 51 using a standard template. To this extent, FIG. 3 shows an illustrative service task template 53 according to an embodiment of the invention. Service task template 53 includes five components 58A-E: a set of task inputs 58A; a set of skills 58B; a set of related assets 58C; a set of task outputs 58D; and a delivery model 58E. In general, the set of task inputs 58A define inputs, such as data, which are used to generate the set of task outputs 58D, such as data, a deliverable, and/or the like. It is understood that the set of task inputs 58A could comprise the empty set (e.g., can have zero or more inputs).

The set of skills 58B and the set of related assets 58C identify the skill(s) (e.g., data collection, data analysis, project management, etc.) and/or asset(s) that may be utilized in generating the task output(s) 58D. To this extent, the set of related assets 58C can be further componentized into different types of assets 59A-C. For example, the set of related assets 58C can include: zero or more tools 59A (e.g., development tools, management/planning tools, problem identification tools, skills management tools, asset management tools, knowledge transfer tools, and/or the like); zero or more techniques 59B (e.g., methods, processes, templates, work breakdown structure (WBS), tasks, white papers, best practices, etc.); and zero or more configurable component(s) 59C (e.g., pre-developed, configurable software/hardware for use/delivery as part of a service). Delivery model 58E can define a solution for delivering the task output 58D to another task, a client, and/or the like. For example, delivery model 58E can comprise face-to-face, chain of command, onsite, etc. Service task template 53 can include the relevant data and/or include a reference to the relevant data, which is stored apart from service task template 53. It is understood that components 58A-E, 59A-C are only illustrative, and other embodiments of service task template 53 may include additional, fewer, and/or different components 58A-E, 59A-C. For example, service task template 53 can include a component that includes information on performing the task, such as: a min/max/typical number of man-hours, days, individuals; location(s) where the task can be performed; required resource(s); and/or the like.

In any event, returning to FIGS. 1 and 2, definition module 32 can enable user 16 to build engagement framework 50 using base tasks 51. For example, user 16 can define a service element, such as service element 56A, by selecting a corresponding set of element tasks 52A-D from all available base tasks 51. Each service element 56A-C can comprise a logical combination of one or more element tasks 52A-M. Additionally, a service element 56A-C can include additional information, such as scheduling and/or resource information, some of which can be derived from the corresponding element tasks 52A-M. Further, service elements 56A-C in engagement framework 50 can be related. For example, a service element, such as service element 56B, can comprise a set of service element inputs that are service element output(s) from another service element 56A, and/or a set of service element outputs that are service element input(s) for another service element 56C. A similar relationship (e.g., output of one is input for another) can exist between element tasks 52A-M that are children of the same service element 56A-C. In this manner, engagement framework 50 can define an order in which service elements 56A-C and/or element tasks 52A-M must be performed based on the dependencies between inputs and outputs.

Definition module 32 can enable user 16 to define an engagement framework 50 having any number of hierarchical levels in a similar manner. To this extent, user 16 can define service definition 54 by selecting a corresponding set of service elements 56A-C. For example, service definition 54 can comprise a set of service inputs and a set of service outputs. The set of service inputs could comprise one or more statements of a problem, requirements, and/or the like, of an entity, and the set of service outputs could comprise one or more corresponding desired resolutions. In this case, definition module 32 can enable user 16 to define a set of service elements 56A-C that generate the set of service outputs based on the set of service inputs. To this extent, the set of service inputs could comprise inputs for one or more service elements 56A-C and/or element tasks 52A-M, and the set of service outputs could comprise outputs of one or more service elements 56A-C and/or element tasks 52A-M. Further, service definition 54 can include information on scheduling, resources, and/or the like, as well as locations for storing information for a particular service engagement (e.g., client, creation date, sales/implementation team, and/or the like). It is understood that definition module 32 can enable user 16 to generate engagement framework 50 using any solution, such as a top-down approach, a bottom-up approach, or some combination thereof.

In an embodiment, framework 50 includes a set of finer-grained sub-tasks for one or more element tasks 52A-M. The set of finer-grained sub-tasks can represent the finest level to which it is practical to break down a work process. Definition module 32 and/or user 16 can identify the finest level using any solution. For example, the finest level can correspond to a unit of work that should be executed only in a single location, by a single team/person, and/or the like. Further, the finest level can correspond to a unit of work which, if further sub-divided into tasks assigned to different persons or teams, would involve an amount of time to transfer information between the constituent sub-divided tasks that is in the range of or exceeds the amount of time needed to execute the constituent sub-divided tasks.

In any event, the sub-tasks and/or base tasks 51 (FIG. 1) can be included in one or more groups of related tasks/sub-tasks. In this case, user 16 can select multiple tasks/sub-tasks by selecting a group. Alternatively, definition module 32 can present user 16 with a set of suggested tasks/sub-tasks based on a selected task's/sub-task's membership in a group. In any event, definition module 32 and/or user 16 can group the tasks/sub-tasks using any solution. For example, the groups can be defined based on a set of criteria that optimizes or improves the overall execution of the tasks/sub-tasks in the group. In order to generate such a grouping, additional information on the tasks-sub-tasks may be required, such as: dependencies between tasks/sub-tasks (e.g., from a directed graph representation); representative amounts of time for performing a task/sub-task, which can be normalized according to a scope of a service engagement; a set of locales in which a task/sub-task can be effectively executed (e.g., customer location, a location where certain desired assets and/or skills are located, a location where costs tend to be lower, any location, and/or the like); a measure of a hand-off cost between tasks/sub-tasks/groupings (e.g., labor cost for conveying information/artifacts); a measure of an intrinsic cost associated with a task/sub-task (e.g., labor cost for execution); and/or the like. To this extent, illustrative criteria for groupings include: tasks/sub-tasks that can be delivered in a single locale and/or by a single team; tasks/sub-tasks that may utilize a particular set of assets (e.g., a tool to analyze a customer's network infrastructure); tasks/sub-tasks of similar levels of variability-in-use (e.g., highly standardized in use, substantially variable in use, and/or the like); tasks/sub-tasks requiring similar execution skills; tasks/sub-tasks having a high potential for parallel execution; and/or the like. Further, groups can be formed based on one or more aspects of the groups. Illustrative aspects include: groups that receive a minimal (e.g., single) set of inputs from another group and output a minimal (e.g., single) set of outputs to another group (e.g., to minimize sub-group interdependencies); groups that reduce/minimize a sum of the hand-off costs between groupings and/or within a group; and/or the like.

In general, the groupings can assist in managing and/or improving effective execution of the tasks/sub-tasks over time. To this extent, definition module 32 and/or user 16 can form groupings of tasks/sub-tasks that are relatively homogeneous with respect to one or more important factors, since the grouping will assist in managing/improving characteristics of the factor(s), and/or other related factors. Illustrative factors include skills, assets leverage, locale, standardization, and/or the like. Additionally, definition module 32 and/or user 16 can form groupings of tasks/sub-tasks based on an optimization calculation that trades off competing factors.

An embodiment of the invention provides an engagement framework 50 that an entity can use to define a service delivery model 60 for multiple types of service engagements. In particular, engagement framework 50 can comprise a standard set of service elements 56A-C, each of which in turn includes a standard set of element tasks 52A-M. Service elements 56A-C are shown including a solution framing element 56A, a plan and design element 56B, and an implementation element 56C, each of which defines a set of tasks to be performed during a corresponding stage of the service engagement. These tasks are selected from the base tasks, and each can be defined using service task template 53 (FIG. 3). In general, during its lifetime, a typical service engagement will progress through each of the three stages.

During the solution framing stage, which is defined by solution framing element 56A, an opportunity for the service engagement and its value are determined. In particular, a relationship is built between entities, needs are expressed, service capabilities are identified and described at a high level, and a value of the service engagement is articulated. To this extent, solution framing element 56A can include a client documentation task 52A, an assessment task 52B, a general approach task 52C, and a framing transition task 52D.

Figure 4:
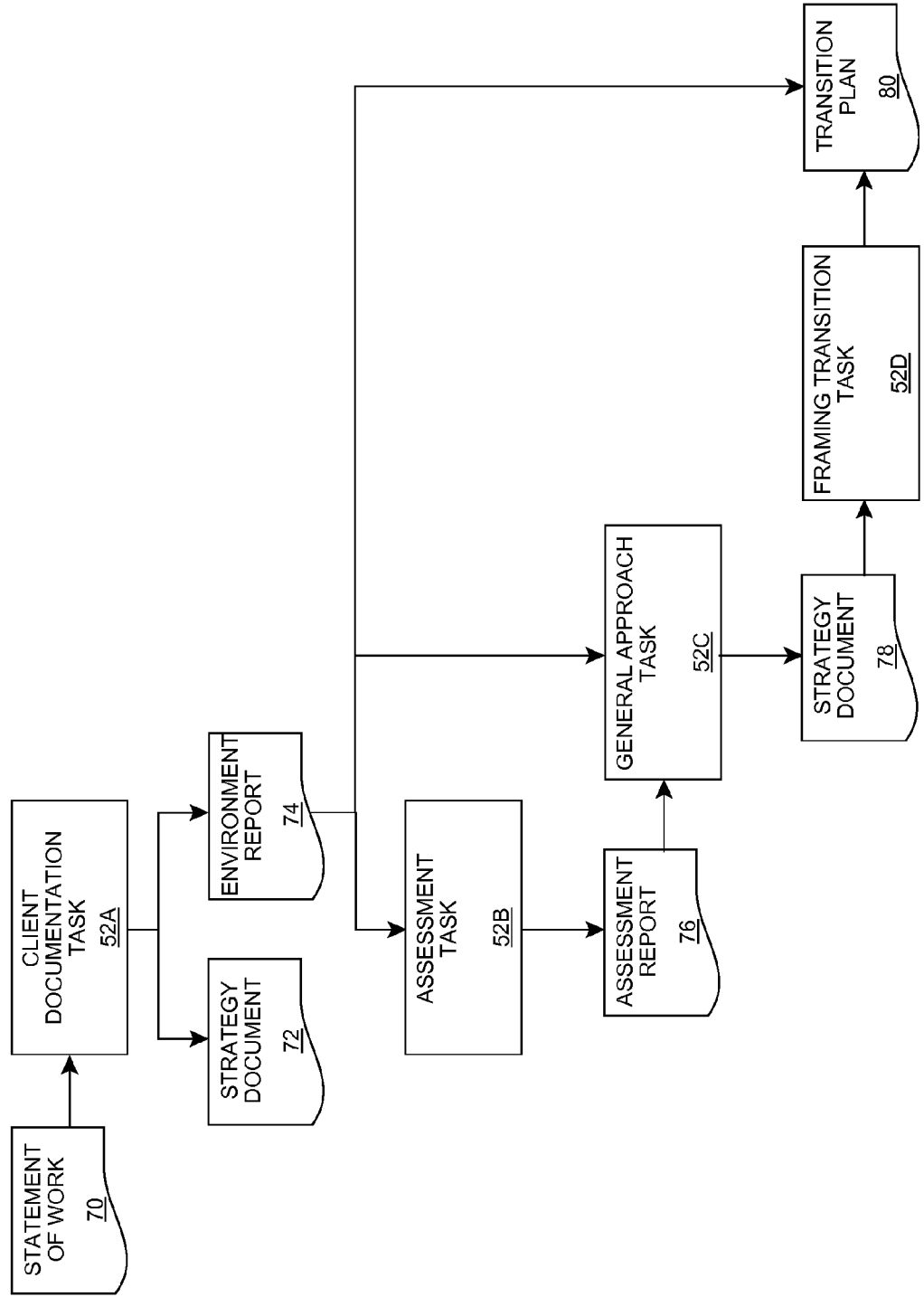
FIG. 4 shows an illustrative data flow between solution framing-related tasks according to an embodiment of the invention.
Figure 5:
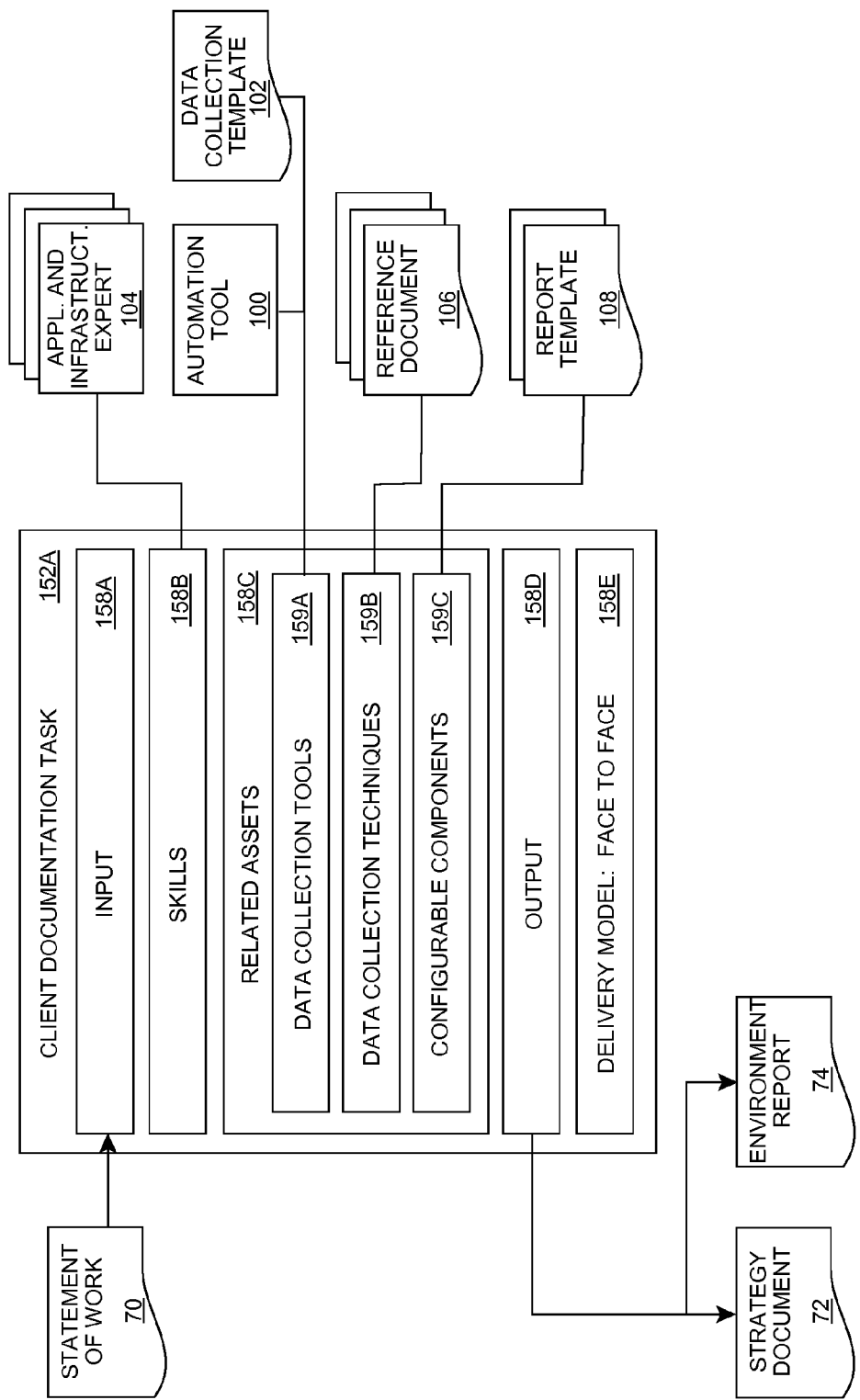
FIG. 5 shows a definition of an illustrative client documentation task according to an embodiment of the invention.

FIG. 4 shows an illustrative data flow between each of these tasks 52A-D according to an embodiment of the invention. As shown, client documentation task 52A can obtain as input a statement of work 70, or the like, from the client and generate as output a strategy document 72 for developing a solution that addresses the statement of work 70 and an environment report 74 that describes the client's current environment. FIG. 5 shows a definition of an illustrative client documentation task 152A according to an embodiment of the invention. Client documentation task 152A includes an input component 158A, which defines a set of inputs (e.g., statement of work 70). While not shown, input component 158A can include a template, which is used to store the input data in a desired format. Client documentation task 152A also includes a set of skills 158B, which can identify one or more experts having the necessary skills to implement some or all of client documentation task 152A, such as an application and infrastructure expert 104. Expert 104 can be specifically identified (e.g., a particular individual) or generically identified (e.g., by a title, skill set, and/or the like). Additionally, client documentation task 152A includes a set of related assets 158C, which includes data collection tools 159A, data collection techniques 159B, and configurable components 159C. In this case, data collection tools 159A are shown including an automation tool 100 and a data collection template 102; data collection techniques 159B are shown including a set of reference documents 106 (e.g., white papers, best practices, and/or the like); and configurable components 159C are shown including a set of report templates 108, which can be used to properly format output(s) of client documentation task 152A. Output component 158D identifies two outputs, a strategy document 72 and an environment report 74. Additionally, delivery model component 158E defines a delivery solution for the output as face to face. It is understood that client documentation task 152A is only illustrative, and numerous alternatives are possible.

Returning to FIG. 4, assessment task 52B can generate an assessment report 76 of the client environment based on environment report 74. To generate assessment report 76, assessment task 52B can include assets that include assessment/analysis tools, skills that include individuals with assessment expertise, and/or the like. General approach task 52C can generate a strategy document 78 (including a high level solution approach/strategy, a business case for the solution, and/or the like) for the services engagement based on assessment report 76 and client environment report 74. General approach task 52C can include assets such as solution template(s), application expert(s), consultant(s) for financial/business case, and/or the like, a skilled infrastructure expert, and/or the like.

Framing transition task 52D can generate a transition plan 80 (including solution approach/strategy and client environment details) for transitioning to another phase of the service engagement (e.g., to service element 56B) based on strategy document 78 and client environment report 74. Framing transition task 52D can include transition template asset(s), skills that include expert(s) for infrastructure and applications, and/or the like. As a result, after performing all solution framing-related tasks 52A-D, several reports/documents, including a strategy document 78 and transition plan 80 are generated based on a statement of work 70.

Returning to FIG. 2, during the planning and design stage, which is defined by plan and design element 56B, additional details are obtained with respect to the client environment/needs, and additional solution details are developed and defined. To this extent, planning and design element 56B is shown including a detailed environment task 52E, a solution approach task 52F, a macro design task 52G, a micro design task 52H, a detailed assessment task 52I, and a design transition task 52J.

Figure 6:
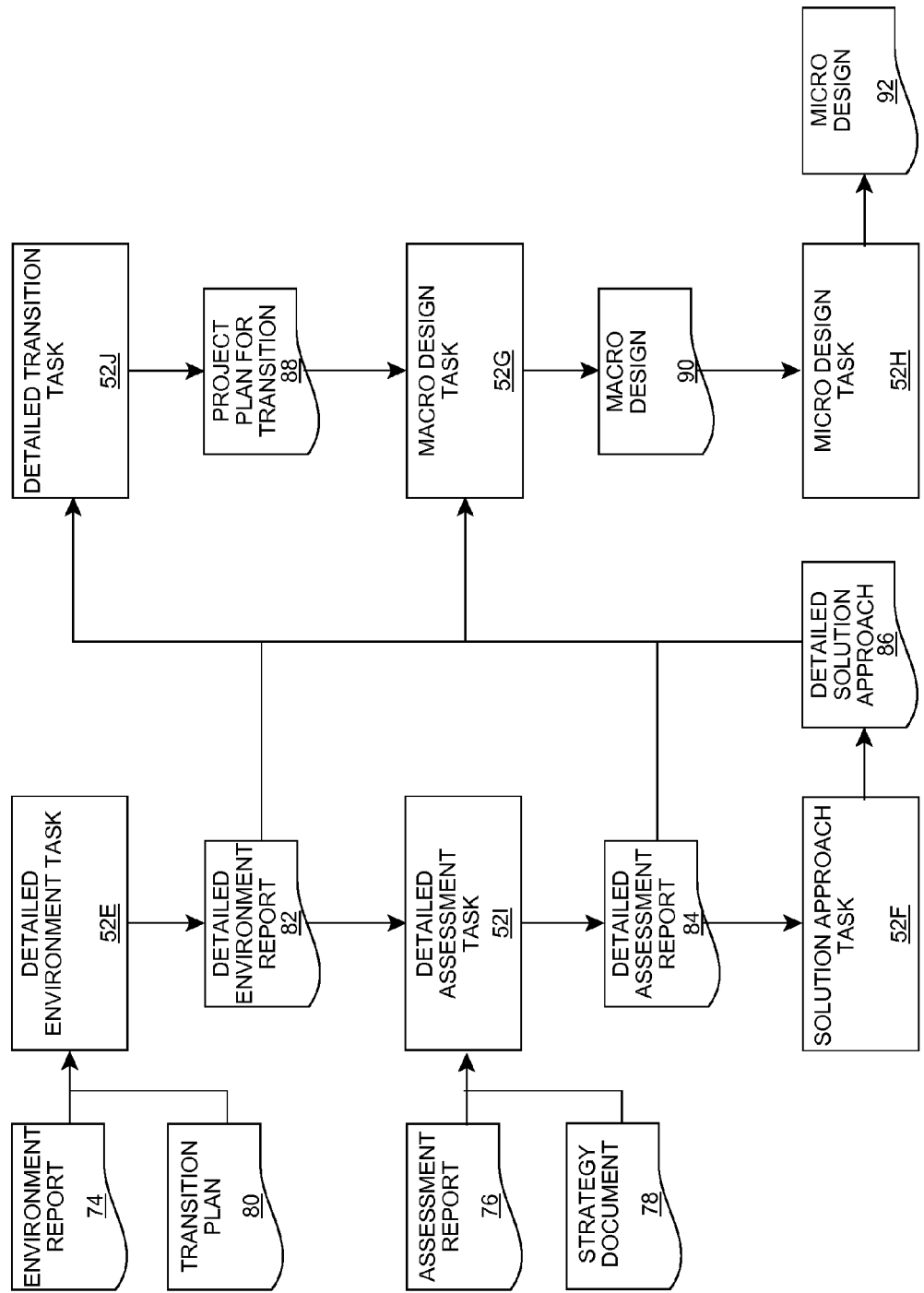
FIG. 6 shows an illustrative data flow between planning and design-related tasks according to an embodiment of the invention.

FIG. 6 shows an illustrative data flow between tasks 56E-J according to an embodiment of the invention. Detailed environment task 52E can obtain environment report 74 and transition plan 80 (generated by solution framing element 56A (FIG. 2)) and generate a detailed environment report 82. Detailed environment task 52E can utilize assets for acquiring and/or analyzing data for the environment (e.g., snapshot data or the like), and include skilled individuals for the particular environment and/or a project manager. Detailed assessment task 52I can obtain assessment report 76 and strategy document 78 as inputs and generate a detailed assessment report 84. Detailed assessment task 52I can utilize assets such as rules based tools, decision tree process(es), and/or the like. Solution approach task 52F can obtain detailed assessment report 84 as input and generate a detailed solution approach 86, and can use assets such as template(s) for conceptual design, predictive tool(s), and/or the like.

Detailed transition task 52J obtains detailed environment report 82, detailed assessment report 84, and detailed solution approach 86 as inputs and generates a project plan for transition 88 as output using a set of transition plan templates as assets. Project plan for transition 88 can comprise a high level project plan and an implementation plan, which includes governance. Macro design task 52G obtains detailed environment report 82, detailed assessment report 84, detailed solution approach 86, and project plan for transition 88 as inputs and generates a macro design 90 for the service as output.

Macro design task 52G can use various templates, discovery tools, guides, and/or the like as assets, individuals with specialized skills (e.g., software engineers, environment specialists, quality assurance, and/or the like), techniques that include white papers, and/or the like. Micro design task 52H can obtain macro design 90 and detailed environment report 82 as inputs and generate a micro design 92 for the service. Micro design 92 can include a prototype, implementation plan, physical design, test plan, governance model (e.g., decision making, change control), and/or the like.

Returning to FIG. 2, during the implementation stage, which is defined by implementation element 56C, the service is implemented and delivered to the customer. To this extent, implementation element 56C is shown including a solution build task 52K, a testing task 52L, and a deployment task 52M. FIG. 7 shows an illustrative data flow between tasks 52K-M according to an embodiment of the invention. Solution build task 52K obtains project plan for transition 88 and micro design 92 as inputs and generates a working solution 94 and support documents 96. Support documents 96 can include implementation instructions, operator guides, training materials, test scripts, deployment plan, and/or the like. Solution build task 52K can utilize assets such as development tools, testing tools, analysis tools, and/or the like, individuals with skills for generating and implementing the solution, and/or the like. Testing task 52L can obtain support documents 96 as input and generate a customer acceptance document 98, in which the customer signs off on the solution. Testing task 52L can utilize assets such as testing tools/methods of the client, a customer signoff template, or the like, and skills such as a project manager, customer engineer, and/or the like. Deployment task 52M can generate a solution acceptance document 98. The solution acceptance document 98 can comprise a document in which the customer signs off on accepting the solution after it has been implemented at the customer's site.

Returning to FIG. 2, in light of the discussion herein, engagement framework 50 defines a service definition 54 that obtains a statement of work 70 (FIG. 4) as a service input and generates a working solution 94 (FIG. 7) and solution acceptance document 98 (FIG. 7) as service outputs. Such a framework 50 can be used to define a delivery model 60 (FIG. 1) for any type of customized solution (e.g., product, configuration, and/or the like), such as an information technology (IT)-related service (e.g., custom software development, hardware/software transformation, and/or the like). It is understood that framework 50 is only illustrative, and alternative inputs/outputs for different types of services can be defined by framework 50.

It is understood that each task 52A-M can be defined using service task template 53 (FIG. 3). To this extent, each task 52A-M can include asset(s), such as one or more techniques, which are described in documents or the like. The techniques can outline/describe various method(s), task(s), work breakdown structure(s), and/or the like, which can be utilized in generating the output for the task 52A-M. Further, each task 52A-M can define a delivery model 58E (FIG. 3) for the output. Various types of delivery models 58E can be selected according to the type of output for the task. Illustrative delivery models 58E include face-to-face, conference call, anchor consultant (e.g., at customer location), offsite build/onsite delivery, or some combination thereof.

As illustrated, framework 50 can comprise a higher-level framework 50 for managing a complete relationship with a customer, from identifying the problem to providing a solution. Further, framework 50 can be utilized to generate a delivery model 60 for managing all the assets (e.g., human, tools, techniques, etc.) for performing the various tasks required to provide the solution. As discussed herein, framework 50 can be readily extended to include additional details. For example, a set of frameworks 50 could be utilized to manage solution build task 52K (e.g., a framework 50 for implementing each component, e.g., hardware, software, or the like, of the solution).

In any event, referring to FIGS. 1 and 2, aspects of the invention provide a solution for defining service delivery model 60 for a service engagement within an engagement framework 50. In particular, when user 16 requests to define a new service delivery model 60, definition module 32 can obtain an appropriate engagement framework 50. Definition module 32 can select and/or enable user 16 to select engagement framework 50 from a set of available engagement frameworks 50 using any solution. For example, engagement framework 50 can be selected based on a type of service engagement to be managed using delivery model 60.

Once obtained, user 16 can use framing module 34 to further define solution framing element 56A and the corresponding element tasks 52A-D for delivery model 60. In particular, framing module 34 can enable user 16 to customize solution framing element 56A and/or element tasks 52A-D based on the service engagement. For example, user 16 can enter details regarding the particular customer, the statement of work 70 (FIG. 4) and/or the like. Further, user 16 can identify specific individuals having particular skills that will be assigned to the particular element tasks 52A-D. Still further, user 16 can generate documents based on the templates referenced by element tasks 52A-D and/or partially complete some of the content for these documents with respect to the particular service engagement (e.g., customer information, project team, time frame, and/or the like). Additionally, user 16 can define a schedule for solution framing element 56A and/or the corresponding element tasks 52A-D. The schedule can define a time frame for completing the task(s) and can account for any dependencies between tasks (e.g., output of one is input for another). Similarly, design module 36 can enable user 16 to further define plan and design element 56B and the corresponding element tasks 52E-J, and implementation module 38 can enable user 16 to further define implementation element 56C and the corresponding element tasks 52K-M.

As a result, upon the initiation of a service engagement, a skeleton service delivery model 60 can be quickly generated using engagement framework 50. As information is acquired/generated, e.g., during initiation/planning/design/implementation of the service engagement, users 16 can use management program 30 to view, add, remove, modify, etc., information relating to the service engagement using service delivery model 60. To this extent, management program 30 can provide overviews on the progress of one or more tasks, scheduling information for the tasks, identify bottlenecks/delays, and/or the like, based on the information in delivery model 60. In this manner, user 16 is provided with a central data structure that includes all of the necessary information for managing the service engagement. Further, use of engagement framework 50 provides a data structure having a consistent format, a common approach to skills and assets, and which is flexible, scalable, and facilitates the reuse of service elements/tasks.

Additionally, each task 52A-M, as defined using service task template 53 (FIG. 3), facilitates the identification of skills, inputs, outputs, and the use and reuse of assets. The use and reuse of assets generally improves the performance, quality, differentiation, and/or the like, of a service. For example, various types of tools frequently result in incremental productivity improvements by permitting a practitioner to perform a task in a reduced amount of time. To this extent, an effective knowledge-sharing tool can eliminate or reduce the extent and/or complexity of direct (synchronous and asynchronous) communication required between parties that need to interface as part of the service delivery. Similarly, an effective asset management tool can assist in the identification and acquisition of assets appropriate for use in a given services task, and can assist in understanding the broader patterns of asset usage and help suggest means for increasing and/or enhancing such usage in the future. By facilitating the use and reuse of such tools, tasks 52A-M help to standardize practice, which can reduce variation and delivery risk, and increase quality.

Tasks 52A-M can obtain similar improvements by facilitating the use and reuse of other assets (e.g., pre-defined, configurable methods, processes, templates, and/or the like). For example, pre-developed, configurable software that is delivered to the customer as part of the service can result in strong productivity increases, since the code delivers value with relatively little additional work required. The service can also be delivered with reduced variation and delivery risk, and increased quality (since much less new software coding is required). This type of asset can also impart substantial differentiation, since the code can embody novel capabilities that other firms are not readily able to offer (for example, proprietary industry-specific fraud detection algorithms).

Feedback module 40 can enable users 16 to update engagement framework 50 based on an amount of success in utilizing a delivery model 60 that was generated within engagement framework 50. For example, user 16 can modify one or more related assets for an element task 52A-M, adjust scheduling/resource information, and/or the like. To this extent, feedback module 40 can manage providing and/or collecting a survey to the various participants (employees and/or customer) of a service engagement, which can be utilized to make one or more modifications to engagement framework 50. Feedback module 40 can be utilized periodically during the service engagement and/or at the end of the service engagement.

While generally shown and described herein as a method and system for managing a service agreement, it is understood that the invention further provides various alternative embodiments. For example, in one embodiment, the invention provides a computer program stored on a computer-readable medium, which when executed, enables a computer system to manage a service agreement. To this extent, the computer-readable medium includes program code, such as management program 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for managing a service agreement. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that performs the process described herein on a subscription, advertising, and/or fee basis. That is, a service provider could offer to manage a service agreement as described herein. In this case, the service provider can manage (e.g., create, maintain, support, etc.) a computer system, such as computer system 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method comprising:
managing a set of base tasks, each base task corresponding to a basic service offered by a business entity and including a set of task inputs, a set of task outputs, and a set of related assets for generating the set of task outputs based on the set of task inputs, wherein the set of related assets includes personnel, tools and techniques used in performing the set of element tasks; and
managing a plurality of types of service engagements using a standard engagement framework, wherein each type of service engagement defines a relationship in which the business entity provides a set of services for a second entity, and wherein the managing comprises:
defining a service delivery model for each type of service engagement based on the standard engagement framework, each service delivery model including:
a service definition including a set of service inputs and a set of service outputs for the type of service engagement;
a set of service elements for generating the set of service outputs based on the set of service inputs, the set of service elements including:
a solution framing element for defining a solution for the service engagement using the service delivery model, the solution framing element including:
a client documentation task that collects the set of service inputs to generate a client environment report;
an assessment task that generates an assessment report of a client environment based on the client environment report;
a general approach task that generates a strategy document based on the assessment report and the client environment report; and
a framing transition task that generates a transition plan based on the strategy document and the client environment report, the transition plan comprising the set of service outputs;
a plan and design element for automatically designing the solution for the service engagement using the service delivery model and the transition plan; and
an implementation element for implementing the solution for the service engagement using the service delivery model; and
a set of element tasks for a service element in the set of service elements, the set of element tasks selected from the set of base tasks, the set of element tasks including:
a build task, a testing task, and a deployment task within the implementation element, wherein the testing task obtains a set of support documents as input and generates a customer acceptance document; and
managing each service engagement using its corresponding service delivery model, wherein the managing includes selecting the service delivery model based on the type of service engagement and managing a set of assets for creating the solution for the service engagement using the service delivery model, wherein the managed set of assets includes personnel, tools and techniques used in performing the set of element tasks.

2. The method of claim 1, the defining including customizing an element task in the set of element tasks based on the service engagement.

3. The method of claim 1, the service delivery model further including a set of sub-tasks for an element task in the set of element tasks.

4. The method of claim 1, the defining including selecting at least one of the set of element tasks based on a group in which the at least one of the set of element tasks is included.

5. The method of claim 1, the solution framing element including a client documentation task, an assessment task, and an approach task.

6. The method of claim 1, the plan and design element including a detailed client task, a solution approach task, a macro design task, a micro design task, and a detailed assessment task.

7. The method of claim 1, the set of element tasks for the service element including a transition task for transitioning to another service element.

8. The method of claim 1, the managing enabling a user to update the service delivery model based on the service engagement.

9. The method of claim 1, the obtaining including:
obtaining a service task template; and defining a base task in the set of base tasks within the service task template.

10. A system comprising:
a set of computing devices for performing a method comprising:
managing a set of base tasks, each base task corresponding to a basic service offered by a business entity and including a set of task inputs, a set of task outputs, and a set of related assets for generating the set of task outputs based on the set of task inputs, wherein the set of related assets includes personnel, tools and techniques used in performing the set of element tasks; and
managing a plurality of types of service engagements using a standard engagement framework, wherein each type of service engagement defines a relationship in which the business entity provides a set of services for a second entity, and wherein the managing comprises:
defining a service delivery model for each type of service engagement based on the standard engagement framework, each service delivery model including:
a service definition including a set of service inputs and a set of service outputs for the type of service engagement;
a set of service elements for generating the set of service outputs based on the set of service inputs, the set of service elements including:
a solution framing element for defining a solution for the service engagement using the service delivery model, the solution framing element including:
a client documentation task that collects the set of service inputs to generate a client environment report;
an assessment task that generates an assessment report of a client environment based on the client environment report;
a general approach task that generates a strategy document based on the assessment report and the client environment report; and
a framing transition task that generates a transition plan based on the strategy document and the client environment report, the transition plan comprising the set of service outputs;
a plan and design element for automatically designing the solution for the service engagement using the service delivery model and the transition plan; and
an implementation element for implementing the solution for the service engagement using the service delivery model; and
a set of element tasks for a service element in the set of service elements, the set of element tasks selected from the set of base tasks, the set of element tasks including:
a build task, a testing task, and a deployment task within the implementation element, wherein the testing task obtains a set of support documents as input and generates a customer acceptance document; and
managing each service engagement using its corresponding service delivery model, wherein the managing includes selecting the service delivery model based on the type of service engagement and managing a set of assets for creating the solution for the service engagement using the service delivery model, wherein the managed set of assets includes personnel, tools and techniques used in performing the set of element tasks.

11. The system of claim 10, the defining including customizing an element task in the set of element tasks based on the service engagement.

12. The system of claim 10, the defining including selecting at least one of the set of element tasks based on a group in which the at least one of the set of element tasks is included.

13. The system of claim 10, the managing enabling a user to update the service delivery model based on the service engagement.

14. The system of claim 10, the obtaining including:
obtaining a service task template; and
defining a base task in the set of base tasks within the service task template.

15. A computer readable storage device storing a computer program comprising program code, which when executed, enables a computer system to implement a method comprising:
managing a set of base tasks, each base task corresponding to a basic service offered by a business entity and including a set of task inputs, a set of task outputs, and a set of related assets for generating the set of task outputs based on the set of task inputs, wherein the set of related assets includes personnel, tools and techniques used in performing the set of element tasks; and
managing a plurality of types of service engagements using a standard engagement framework, wherein each type of service engagement defines a relationship in which the business entity provides a set of services for a second entity, and wherein the managing comprises:
defining a service delivery model for each type of service engagement based on the standard engagement framework, each service delivery model including:
a service definition including a set of service inputs and a set of service outputs for the type of service engagement;
a set of service elements for generating the set of service outputs based on the set of service inputs, the set of service elements including:
a solution framing element for defining a solution for the service engagement using the service delivery model, the solution framing element including:
a client documentation task that collects the set of service inputs to generate a client environment report;
an assessment task that generates an assessment report of a client environment based on the client environment report;
a general approach task that generates a strategy document based on the assessment report and the client environment report; and
a framing transition task that generates a transition plan based on the strategy document and the client environment report, the transition plan comprising the set of service outputs;
a plan and design element for automatically designing the solution for the service engagement using the service delivery model and the transition plan; and
an implementation element for implementing the solution for the service engagement using the service delivery model; and a set of element tasks for a service element in the set of service elements, the set of element tasks selected from the set of base tasks, the set of element tasks including:

a build task, a testing task, and a deployment task within the implementation element, wherein the testing task obtains a set of support documents as input and generates a customer acceptance document; and managing each service engagement using its corresponding service delivery model, wherein the managing includes selecting the service delivery model based on the type of service engagement and managing a set of assets for creating the solution for the service engagement using the service delivery model, wherein the managed set of assets includes personnel, tools and techniques used in performing the set of element tasks.

16. The computer readable storage device of claim 15, the defining including customizing an element task in the set of element tasks based on the service engagement.

17. The computer readable storage device of claim 15, the defining including selecting at least one of the set of element tasks based on a group in which the at least one of the set of element tasks is included.

18. The computer readable storage device of claim 15, the managing enabling a user to update the service delivery model based on the service engagement.

19. The computer readable storage device of claim 15, the obtaining including:

obtaining a service task template; and defining a base task in the set of base tasks within the service task template.

20. A method of generating a system, the method comprising:

providing a computer system operable to:

manage a set of base tasks, each base task corresponding to a basic service offered by a business entity and including a set of task inputs, a set of task outputs, and a set of related assets for generating the set of task outputs based on the set of task inputs, wherein the set of related assets includes personnel, tools and techniques used in performing the set of element tasks; and manage a plurality of types of service engagements using a standard engagement framework, wherein each type of service engagement defines a relationship in which the business entity provides a set of services for a second entity, and wherein the managing comprises:

defining a service delivery model for each type of service engagement based on the standard engagement framework, each service delivery model including:

a service definition including a set of service inputs and a set of service outputs for the type of service engagement;

a set of service elements for generating the set of service outputs based on the set of service inputs, the set of service elements including:

a solution framing element for defining a solution for the service engagement using the service delivery model, the solution framing element including:

a client documentation task that collects the set of service inputs to generate a client environment report;

an assessment task that generates an assessment report of a client environment based on the client environment report;

a general approach task that generates a strategy document based on the assessment report and the client environment report; and a framing transition task that generates a transition plan based on the strategy document and the client environment report, the transition plan comprising the set of service outputs;

a plan and design element for automatically designing the solution for the service engagement using the service delivery model and the transition plan; and an implementation element for implementing the solution for the service engagement using the service delivery model; and a set of element tasks for a service element in the set of service elements, the set of element tasks selected from the set of base tasks, the set of element tasks including:

a build task, a testing task, and a deployment task within the implementation element, wherein the testing task obtains a set of support documents as input and generates a customer acceptance document; and managing each service engagement using its corresponding service delivery model, wherein the managing includes selecting the service delivery model based on the type of service engagement and managing a set of assets for creating the solution for the service engagement using the service delivery model, wherein the managed set of assets includes personnel, tools and techniques used in performing the set of element tasks.

* * * * *